United States Patent Office 3,444,032
Patented May 13, 1969

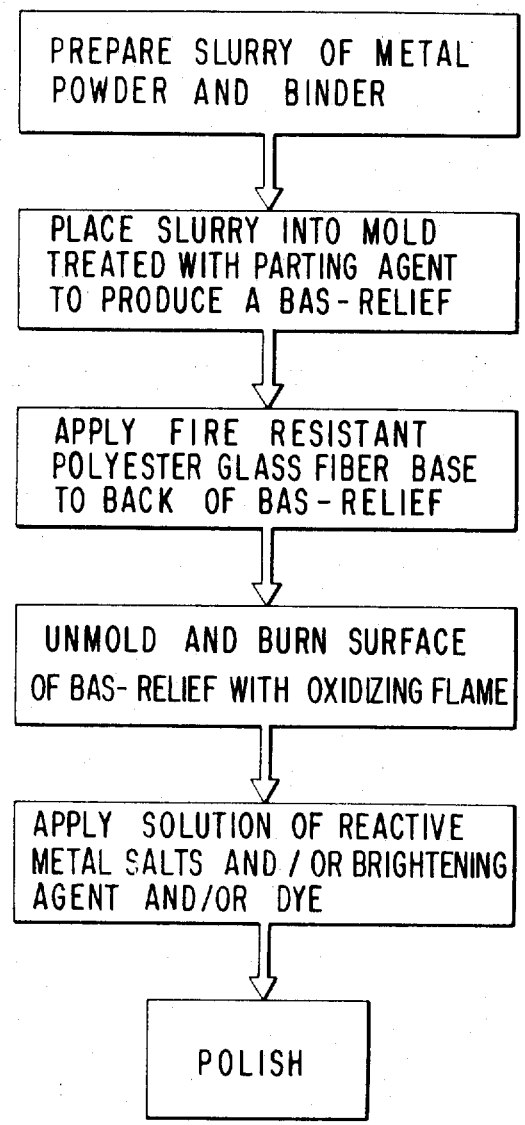

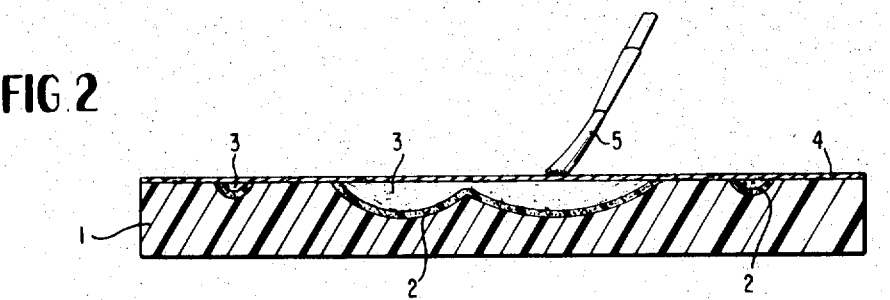
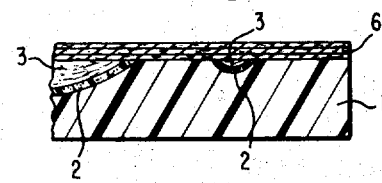
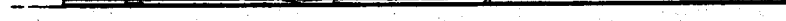
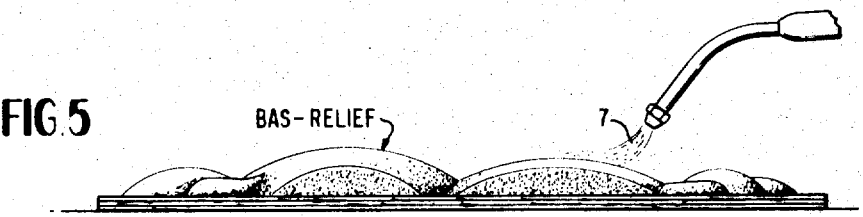
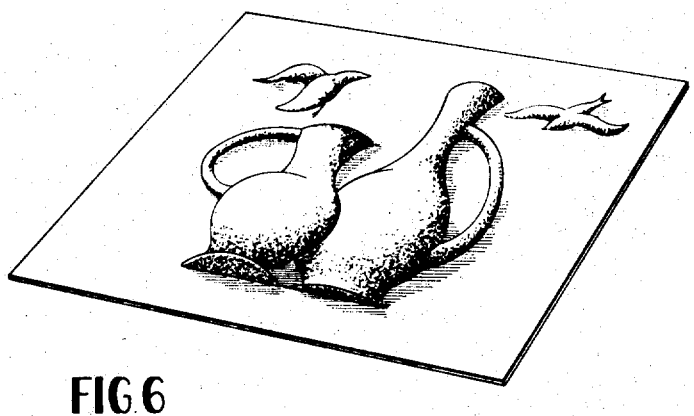

3,444,032
METALLIC SCULPTURED BAS-RELIEF ARTICLE
AND METHOD OF FORMING THE SAME
George J. Kreier, Jr., 1524 Cambridge St.,
Philadelphia, Pa. 19130
Filed Jan. 20, 1966, Ser. No. 521,901
Int. Cl. B32b *15/14, 11/16;* B29d *27/00*
U.S. Cl. 161—18          18 Claims

ABSTRACT OF THE DISCLOSURE

A method and the resulting article of forming a decorative panel which includes, applying a slurry of metal powder and binder to the recesses of a patterned mold treated with a parting agent, applying a fire-resistant panel to the back of the molded slurry, curing said slurry and fire-resistant panel to form a bas-relief pattern and flame treating the surface of the cured slurry, after removing the composite panel from the mold, to burn away the binder so as to form a porous metallic pattern upon the fire-resistant panel.

---

This invention relates to a method of forming raised decorative figures on a fire-resistant panel, and more particularly, to a method of treating the raised figures to achieve unusual decorative results.

An object of this invention is to provide structural members with novel decorative qualities.

Another object is to provide a method by means of which bas-relief figures are formed on fire-resistant panels.

Another object is to provide a method of removing a plastic binder from a composite metal and plastic bas-relief.

Another object is to provide structural members with a controlled surface texture by a molded metallic layer.

Another object is to provide a method by which metal bas-relief figures are brightly colored.

Another object is to provide plastic panels having metallic bas-relief figures which are lightweight, inexpensive, highly resistant to breakage and deterioration, and have the appearance of architectural bronze.

Another object is to provide a decorative architectural panel that is fire resistant.

These and other objects and novel features of the invention will be more clearly and fully set forth in the following specification, attached drawings and claims. In the drawings:

FIG. 1 illustrates a flow diagram of the method of forming raised decorative figures;

FIG. 2 illustrates the mold with the sunken metal figures in position over which a fiber glass material has been placed and showing how a binding and fire-resistant agent are applied over the back of the assembly as by means of a brush;

FIG. 3 is a partial section similar to that of FIG. 2 showing a plurality of layers of fiber glass material and applied liquid resin built up on the sculptured metal figures;

FIG. 4 illustrates the step of separating the molded panel from the mold;

FIG. 5 illustrates the step of using an oxidizing flame to remove the binder from the sculptured metal figures;

FIG. 6 is an isometric projection illustrating the finished panel; and

FIG. 7 illustrates a portion of a panel made by the method of the present invention and including a rearwardly extending flange for increasing its structural strength.

As shown in FIG. 1, the first step in the method by which bas-relief figures are formed is the preparation of a slurry which comprises a minimal amount of binder and a metal powder. Stainless steel powder, silver powder, nickel powder, gold powder, platinum powder, palladium powder or cooper-zinc alloy powder (commonly called "bronze powder") may be used. "Bronze powder" has been available in the industry for the past 90 years at least, and this term will be used throughout for defining copper base metallic particles of flake-like structure. The particle size range which the metal powders of the present invention must have is as follows.

| Sieve size: | Approximate percent |
|---|---|
| Retained on 100 | 5–15 |
| Retained on 150 | 5–10 |
| Retained on 170 | 5–10 |
| Retained on 200 | 5–10 |
| Retained on 325 | 20–30 |
| Passed | 40–60 |

Approximately 80–90% of the metal powder by weight must be coarser than 100 mesh, approximately 35–40% coarser than 200 mesh, and the rest finer. It is preferred that 40–60% pass through 325 mesh to give close packing.

The powdered metal is mixed with a styrene polyester binder or the like.

The proportions of these ingredients are adjusted so that the slurry contains 90–95% metal powder by weight and 70–92% metal powder by volume.

The method may be best understood with reference to a particular example.

EXAMPLE I

A slurry is prepared by mixing in a vessel just prior to the molding operation a mixture having the following composition:

A mixture of about 54% by weight of polyester resins made up of 3 parts of rigid-type polyester resin (Paraplex P43 believed to be a condensation product of propylene glycol and dipropylene glycol in the ratio of 1 to 3 with phthalic anhydride and maleic anhydride in the ratio of 3 to 2) and 1 part of flexible-type polyester resin (Paraplex P13, which is reported by the supplier to be a condensation product of ethylene glycol and diethylene glycol with phthalic anhydride, maleic anhydride and adipic acid), and 46% by weight of styrene monomer was prepared.

To this initial mixture were added the following:

| | | |
|---|---|---|
| Styrene monomer (solvent) | lbs | 2 |
| Methyl ethyl ketone peroxide (catalyst) | cc | 80 |
| Manganese naphthanate (catalyst) | lb | 0.12 |

The resulting mix was agitated and to it was added promptly the following filler: 94 pounds "bronze powder" having the following sieve analysis.

| Sieve size: | Percentage |
|---|---|
| Retained on 100 | 10.90 |
| Retained on 150 | 7.50 |
| Retained on 170 | 6.00 |
| Retained on 200 | 6.70 |
| Retained on 325 | 22.10 |
| Passed | 46.40 |

The bronze powder, available in various degrees of fineness from the manufacturer, is added to the mixture gradually and continuously agitated in order to thoroughly set the powder and prevent it from settling out. The slurry is now ready for molding.

Reference is made to the flow diagram of FIG. 1 wherein there is shown the sequence of procedural steps:

(a) Prepare slurry of metal powder and binder.
(b) Place slurry into mold treated with parting agent to produce a bas-relief.
(c) Apply fire-retardant polyester glass fiber base to back of bas-relief.

(d) Unmold and burn surface of bas-relief with oxidizing flame.
(e) Apply solution of reactive metal salts and/or brightening agent and/or dye.
(f) Polish.

In this connection, the flow diagram of FIG. 1 has its counterpart in the illustration of the mold with sunken metal figures in position, as illustrated in FIGS. 2, 3, 4, 5, 6 and 7. A flexible mold 1 of polymercaptan base synthetic is placed in the position indicated in FIG. 2; namely, the recessed portions (corresponding to the high points on the bas-relief) facing upwardly in position to receive the slurry which will form the bas-relief figure of the panel.

The surface of the mold 1 is first properly prepared with suitable parting agents in a manner which will be understood by those skilled in the art, after which the molding of the slurry takes place. By way of example, water-soluble waxes and polyvinyl alcohol films are well adapted for use as parting agents because they will prevent chemical interaction between the mold and the slurry. Those skilled in the art will recognize others which may be similarly suitable.

The slurry 2 is now placed into the recessed portions of the mold in one or more coats of a thickness of 1/16" depending upon the depth of the recesses to a preferred thickness of 1/8". A layer of chopped fiberglass matting 3 impregnated with polyester resins, which are the resins I prefer to use in the manufacturing of my panels, is now placed where necessary over the metal slurry filling in the recessed portion of the mold up to a point level with its upper surface.

A fiber glass mat material 4 is now placed over the mold with the figures in place as shown in FIG. 2. A mixture of polyester resin and 20% by volume of a fire-resistant material, such as antimony oxide, phosphates, borates or chlorinated polyesters, such as those old under the name "Hetron" by Hooker Electric-Chemical Company, is applied to the mat surface. This application of fire-resistant resin is preferably done by a brushing operation rather than a pouring operation and a brush 5 is indicated for this purpose. The reason for the brushing procedure is that it gives better control of the quantity of resin which is applied to the surface. It should be sufficient to permeate the fibers of the mat and come into contact with the upper surface of the molded figures, but it should not be sufficient to work its way down into the recesses in which the figures are resting. The operation just described should substantially saturate the fiber material, and effect both a bond between this material and the individual pre-cast figures resting in the mold and provide a fire-resistant surface on the base material.

A series of layers of figer glass mat 4 and woven material 6 are alternately applied one after the other with suitable hardening of the previously applied resin before the next layer is added. The polyester and fire-resistant material mixture is used to bond and fire-proof the first few layers, the number of layers to be fire-proofed depends upon the degree of resistance desired. I prefer to impregnate with the fire-proofing resin two or more layers. The number of layers of mat and material which should be used will be determined by the strength desired in the final structure. The use of a plurality of layers is shown in the fragmentary view of FIG. 3.

Additional rigidity can be given to the panel by providing its edges with a rearwardly projecting flange 8 as shown in FIG. 7. The provision of the flange 8 in the embodiment of FIG. 7 gives additional strength and rigidity to the panel. Any tendency toward warping of the sculptured relief can be better controlled and it also facilitates installation of the panels by providing an edge for mechanical fastening means.

After the resin which was applied to the back of the panel has been sufficiently cured, the mold and the panel may be separated as shown diagrammatically in FIG. 4. Here the flexible mold is of particular advantage because it can be bent away from the panel as indicated in the figure and this capability greatly facilitates separation of the mold and the panel.

The panel is set face up on a work bench and an oxidizing flame 7 is applied to the bas-relief figures. The oxidizing flame burns into the bas-relief figures formed from the slurry to a depth of 1/64". Since the resin used with the metal powder to form the slurry does not have any fire-resistant agents incorporated therein, the styrene polyester resin burns cleaning away at about 850° F. to a depth of 1/64". When the resin burns away from the slurry, a solid facing of metal in a porous condition is exposed. The surface of the backing panel is not affected by the oxidizing flame because of the incorporation of the flame-proofing agents therein.

From the foregoing description, it is seen that the method steps under FIG. 1 have been carried out from the initial preparation of the slurry to the application of the fire-retardant backing, and the firing of the metal surface to expose the solid face of the metal in porous condition, and the product is now ready for dyeing, brightening, burnishing and polishing under the procedures illustrated in steps (e) and (f) of FIG. 1.

For the purpose of brightening the copper metal, there may be employed a water-soluble salt of an inorganic oxidizing acid, such as a salt of nitric acid, nitrous acid, phosphorous acid, hydrochlorous acid, perchloric acid, and the like. The salt may be sodium, potassium lithium, ammonium or quaternary ammonium salts. Soluble metal salts may be used, such as copper, nickel, cobalt or zinc salts, but in order to accentuate the appearance of antiquity of the resulting sculpture, it is preferred that the alkali metal salts be utilized.

Where a brightening agent is employed in the finishing step, the brightening agents may be those which are known in connection with the particular metal. An example of brightening agents for copper is ammonium oxalate and oxalic acid. The value of this combination used in water solution is that the salts decompose under heat. Brightening requires a heat step, either by flame or by baking at a temperature up to 500° C. This brightening agent has been used in a similar concentration as herein (4% by weight of a mixture of equal parts of ammonium oxalate and oxalic acid in water) in U.S. patent to Homer, No. 2,647,066.

A dyeing solution may be employed along the lines disclosed in column 4 of Miller, U.S. Patent No. 3,106,484. The examples of the dyes which have been used to dye the present bronze sculpture are the following:

Brass, gold, yellow:
    Ciba, Inc.—Oxanal Yellow Gr concentrated, Oxanal Orange G, Oxanal Orange REX concentrated
    DuPont—Orange RO, Capracyl Orange R, Capracyl Brown 2R Green:
    Ciba, Inc.—Oxanal Green BL
    DuPont—Pontacyl Green B1, Anthraquinone Green GNN
    General Dyestuff—Tartrazine C Extra CF Black:
    DuPont—Pontacyl Fast Black N2B concentrated, Pontacyl Blue Black 3BA Red:
    DuPont—Brilliant Crocein FL Blue:
    Ciba, Inc.—Oxanal Blue C–200, Oxanal Blue CB
    DuPont—Anthraquinone Blue RX0, Anthraquinone Blue SWF Violet, purple:
    DuPont—Pontacyl Fast Violet 10B concentration 175% Anthraquinone Violet 3RN
    General Dyestuff—Croseia Scarlet N Extra There may also be used liquid bright gold compositions, such as are disclosed in Ballard, U.S. Patent No. 2,490,399, referred to as a terpene mercaptan gold resinate, or as disclosed in U.S. Patent No. 2,842,457, granted to J. E. Morgan and C. W. Wagner. These thermosetting compositions are made by dissolving gold resinate of terpene mercaptan gold resinate and suitable gold fluxes in a solvent mixture which also dissolves a certain thermosetting epoxy resin and a certain catalyst for this epoxy resin. There may also be employed liquid gold compositions as shown in U.S. Patents 2,984,574 and 3,092,504.

If desired, there may be employed copper tellurium composition as shown in Mason Patent No. 2,933,422, these consisting essentially of a copper tellurate applied to the bronze surface in aqueous alkali and thereafter heated, dried and polished in order to achieve a blue or black coloration.

There may also be used a water-insoluble phthalocyanine dye of the type used with aluminum in Cochran, U.S. Patent No. 3,114,660.

After the bas-relief figures have been dyed, brightened or burnished, they may be polished in a manner which will be understood by those skilled in the art. By way of example, a high speed buffing machine utilizing a cloth or fine wire brush and a suitable polish is well adapted for use as a method of polishing. Those skilled in the art will recognize others that may be similarly suitable.

I claim:

1. A method of forming decorative panels comprising: preparing a slurry of metal powder and binder; treating a mold having recessed portions with a parting agent; placing said slurry in said recessed portions of said mold; applying a fire-resistant panel to the back of said molded slurry; curing said slurry and said fire-resistant panel to form an integral bas-relief; removing said bas-relief from said mold; and firing the raised surface of said bas-relief with an oxidizing flame, whereby said binder burns away leaving a porous metal figure on said fire-resistant panel.

2. A method of forming decorative panels in accordance with claim 1 wherein said porous metal figure is treated with a reactive metal salt solution.

3. A method of forming decorative panels in accordance with claim 1 wherein said porous metal figure is treated with a brightening agent and heated.

4. A method of forming decorative panels in accordance with claim 1 wherein said porous metal figure is treated with a dye solution.

5. A method of forming decorative panels in accordance with claim 1 wherein said porous metal figure is polished.

6. A method of forming decorative panels in accordance with claim 1 wherein said slurry comprises: 90 to 95% metal powder by weight, and a styrene polyester binder.

7. A method of forming decorative panels in accordance with claim 6 wherein said mold is flexible.

8. A method of forming decorative panels in accordance with claim 7 wherein said slurry is placed in said recesses of said mold to a maximum thickness of 3/16 inch and said recess is filled level with a polyester impregnated fiber glass matting.

9. A method of forming decorative panels in accordance with claim 8 wherein said fire-resistant panel comprises a fiber glass material impregnated with a mixture of polyester resin and a fire-resistant agent.

10. A method of forming decorative panels in accordance with claim 9 wherein said fire-resistant agent comprises a material selected from the group consisting of oxides, phosphates, borates and chlorinated polyesters.

11. A method of forming decorative panels in accordance with claim 10 wherein said porous metal figure is fired with an oxidizing flame to a depth of 1/64 inch.

12. A method of forming raised decorative figures on a plastic panel comprising: preparing a slurry of between 90 to 95% metal powder by weight and a styrene polyester binder; coating a flexible mold having cavities therein with a parting agent; placing said slurry in said cavities of said mold to a thickness of 1/16 to 3/16 inch; filling the remainder of said cavity with fiber glass matting impregnated with a polyester resin; laying a plurality of layers of fiber glass material over the cavitated face of said mold; impregnating said fiber glass material with a mixture of polyester resin and 20% by volume of a fire-resistant agent; curing said slurry and said impregnated fiber glass material to form an integral bas-relief; removing said bas-relief from said mold; and burning the raised surface of said bas-relief with an oxidizing flame to a depth of 1/64 inch, whereby said binder burns away leaving a porous metal figure on said fire-resistant panel.

13. A decorative panel produced in accordance with claim 12 comprising a fire-resistant panel and a decorative bas-relief figure on said panel, said figure having a porous metal surface.

14. A decorative panel in accordance with claim 13 wherein said fire-resistant panel comprises a plurality of layers of fiber glass material impregnated with a mixture of polyester resin and a fire-resistant agent.

15. A decorative panel in accordance with claim 14 wherein said bas-relief figure comprises a mixture of metal powder and binder, said binder being partially burned away from the surface of said figure, leaving a porous metal surface on said figure.

16. A decorative panel in accordance with claim 15 wherein said porous metal figure has the appearance of architectural bronze.

17. A decorative panel in accordance with claim 16 wherein said porous metal figure is colored by application of a dye to its porous surface.

18. A decorative panel in accordance with claim 17 wherein said fire-resistant panel has a rearwardly extending flange on an edge thereof.

References Cited

UNITED STATES PATENTS

| | | | |
|---|---|---|---|
| 2,275,592 | 3/1942 | Menihan | 264—111 |
| 2,620,227 | 12/1952 | Iwase et al. | 161—18 XR |
| 3,018,520 | 1/1962 | Renaud | 264—111 XR |
| 3,061,500 | 10/1962 | Kreier | 156—245 |
| 3,109,331 | 11/1963 | Cordray et al. | 161—7 XR |
| 3,322,609 | 5/1967 | Vida | 161—5 |

ROBERT F. BURNETT, *Primary Examiner.*

W. A. POWELL, *Assistant Examiner.*

U.S. Cl. X.R.

156—59, 245, 289; 161—44, 117, 403, 413; 264—111